(12) United States Patent
Wang et al.

(10) Patent No.: US 11,830,164 B2
(45) Date of Patent: Nov. 28, 2023

(54) SEMANTIC LEARNING-BASED DOWN-SAMPLING METHOD OF POINT CLOUD DATA OF AIRCRAFT

(71) Applicant: Nanjing University of Aeronautics and Astronautics, Nanjing (CN)

(72) Inventors: Jun Wang, Nanjing (CN); Zhongde Shan, Nanjing (CN); Kaijun Zhang, Nanjing (CN); Zikuan Li, Nanjing (CN); Chao Li, Nanjing (CN)

(73) Assignee: Nanjing University of Aeronautics and Astronautics, Nanjing (CN)

( * ) Notice: Subject to any disclaimer, the term of this patent is extended or adjusted under 35 U.S.C. 154(b) by 0 days.

(21) Appl. No.: 18/316,317

(22) Filed: May 12, 2023

(65) Prior Publication Data

US 2023/0306557 A1      Sep. 28, 2023

(51) Int. Cl.
  *G06T 3/40*      (2006.01)
(52) U.S. Cl.
  CPC .................................. *G06T 3/4046* (2013.01)
(58) Field of Classification Search
  CPC .................................................. G06T 3/4046
  See application file for complete search history.

(56) References Cited

U.S. PATENT DOCUMENTS

2023/0075442 A1*   3/2023   Ma ....................... H04N 19/192

FOREIGN PATENT DOCUMENTS

| CN | 105928457 A | 9/2016 |
| CN | 107092021 A | 8/2017 |

OTHER PUBLICATIONS

Zhongde Shan et al.,"Research on Forming Manufacturing Technology and Equipment of Composite Preforms", China Mechanical Engineering, 2021, vol. 32, Issue 23, pp. 2774-2784, 2831.
Yandong Pei et al.,"Overview of content and semantic based 3D model retrieval", Journal of Computer Applications, 2020, vol. 40, Issue 7, pp. 1863-1872.

* cited by examiner

*Primary Examiner* — Mark Roz

(57) ABSTRACT

This application discloses a semantic learning-based down-sampling method of point cloud data of an aircraft, including: (S1) constructing a multi-input encoder based on feature learning according to point cloud semantic learning principle; inputting the point cloud data of the aircraft and feature point data into the multi-input encoder for feature fusion followed by decoding using a decoder the multi-input feature fused data to obtain to-be-measured data; (S2) constructing and training a point cloud feature weight calculation network based on semantic learning to acquire a feature weight of each point in the to-be-measured data; and (S3) performing spatial weighted sampling on the feature weight of each point in the to-be-measured data followed by down-sampling based on Gaussian distribution-based spatial sampling principle.

7 Claims, 4 Drawing Sheets

SEMANTIC LEARNING-BASED DOWN-SAMPLING METHOD OF POINT CLOUD DATA OF AIRCRAFT

CROSS-REFERENCE TO RELATED APPLICATIONS

This application claims the benefit of priority from Chinese Patent Application No. 202210511610.2, filed on May 12, 2022. The content of the aforementioned application, including any intervening amendments thereto, is incorporated herein by reference.

TECHNICAL FIELD

This application relates to three-dimensional (3D) data visualization, and more particularly to a semantic learning-based down-sampling method of point cloud data of an aircraft.

BACKGROUND

Laser radar and three-dimensional (3D) scanning technology have now been widely applied to many fields, such as surveying and mapping, power line inspection, digital city construction, ancient building protection, military equipment measurement, and digital twinning. By means of the 3D scanning technology, massive 3D point cloud data (generally reaching a volume of hundreds of millions) can be quickly collected. In the aircraft inspection, due to the large size and complex structure of the aircraft, the volume of the collected point cloud data is enormous, such that more resource space is required. Moreover, there is also a large amount of redundant information, which is adverse to the point cloud-based inspection of the whole aircraft. Therefore, it is of great significance to downsample the point cloud data. Currently, how to achieve effective down-sampling of large-scale point cloud data and ensure the integrity of key point cloud information still remains to be solved.

With the continuous deepening of researches on 3D data, many point cloud down-sampling strategies have been proposed. The traditional partitioned downsampling method uses different sampling intervals for different regions, so as to achieve the multi-density sampling. However, this method involves tedious and complicated operations and considerable manual intervention, and thus is not conducive to improving the production efficiency.

SUMMARY

An object of this disclosure is to provide a semantic learning-based down-sampling method of point cloud data of an aircraft to overcome the defects in the prior art. In the down-sampling method provided herein, the sampling process is constrained by introducing the information of the key feature point, which not only facilitates the sampling of the point cloud data with an extremely large volume and containing a lot of useless information, but also ensures that the point cloud information in the key feature point region will not be lost, ensuring the effectiveness and reliability of the output sampling results.

The technical solutions of the disclosure are described below.

This application provides a semantic learning-based down-sampling method of point cloud data of an aircraft, comprising:

(S1) constructing a multi-input encoder based on feature learning according to point cloud semantic learning principle; inputting the point cloud data of the aircraft and feature point data into the multi-input encoder for feature fusion followed by decoding using a decoder to obtain decoded data as to-be-measured data;

(S2) constructing and training a point cloud feature weight calculation network based on semantic learning to acquire a feature weight of each point in the to-be-measured data; and (S3) performing spatial weighted sampling on the feature weight of each point in the to-be-measured data followed by down-sampling according to Gaussian distribution-based spatial sampling principle.

In some embodiments, the step (S1) further comprises:
designing the multi-input encoder according to requirement of synchronous input of the point cloud data of the aircraft and the feature point data; performing, by the multi-input encoder, feature dimension increasing and the feature fusion on the point cloud data of the aircraft and the feature point data to obtain multi-input feature fused data with a unified data structure; and (S102) decoding, by the decoder, the multi-input feature fused data obtained in step (S101) to obtain the to-be-measured data.

In some embodiments, the decoder is composed of four convolution layers; and the to-be-measured data is consistent with the point cloud data of the aircraft and the feature point data in structure and dimension to ensure an integrity of encoded information.

In some embodiments, the step (S2) comprises:
(S201) designing the point cloud feature weight calculation network based on semantic learning;
(S202) training the point cloud feature weight calculation network several times according to a standard data set of the point cloud data of the aircraft and the feature point data to obtain a trained weight as a fundamental parameter of the point cloud feature weight calculation network and
inputting the to-be-measured data into the point cloud feature weight calculation network to predict the feature weight of each point in the to-be-measured data.

In some embodiments, the step (S2) further comprises:
(S203) storing the feature weight of each point in the to-be-measured data as a label followed by displaying in a scalar field to obtain a feature weight distribution map of each point in the to-be-measured data.

In some embodiments, the step (S202) further comprises:
(S202-1) collecting measurement data of the aircraft from a point cloud database of the aircraft obtained in a production process; manually extracting the feature point data from the measurement data of the aircraft; setting a weight value according to an importance of individual parts of the aircraft, wherein the weight value ranges from 0 to 1; when the weight value is equal to 0, it indicates a corresponding part is the least part of the aircraft, and when the weight value is equal to 1, it indicates that a corresponding part is the most important part of the aircraft; and constructing the standard data set of the point cloud data of the aircraft and the feature point data;

(S202-2) training the point cloud feature weight calculation network based on semantic learning;
wherein a first stage of the training is a forward propagation, and a point cloud data sample is selected from the point cloud data of the aircraft and the feature point data, respectively; and
a second stage of the training is a reverse propagation, and the reverse propagation is performed according to a difference between an actual output and an ideal output by using a gradient descent objective function minimization method to adjust an internal reference of a convolution kernel, so as to complete the training; and (S202-3) inputting the to-be-measured data into the point cloud feature weight calculation network to predict the feature weight of each point in the to-be-measured data.

In some embodiments, the step (S3) comprises:

(S301) setting a sampling device; picking up, by the sampling device, the feature weight of each point in the to-be-measured data; and performing the spatial weighted sampling according to the feature weight;

(S302) performing the down-sampling based on the Gaussian distribution-based spatial sampling principle, wherein a maximum weight value and a minimum weight value obtained in step (S301) respectively correspond to a highest point and a lowest point on a Gaussian curve; and a minimum spatial down-sampling is performed on the highest point, and a maximum spatial down-sampling is performed on the lowest point.

Compared to the prior art, the present disclosure has the following beneficial effects.

The down-sampling method provided herein can realize the effective down-sampling of large-scale point cloud, and ensure the integrity of key point cloud information, which can overcome the defect of low production efficiency in the traditional point cloud block down-sampling method due to the massive manual intervention.

DETAILED DESCRIPTION OF EMBODIMENTS

The embodiments of this application will be described in detail below with reference to the accompanying drawings.

Figure 1:
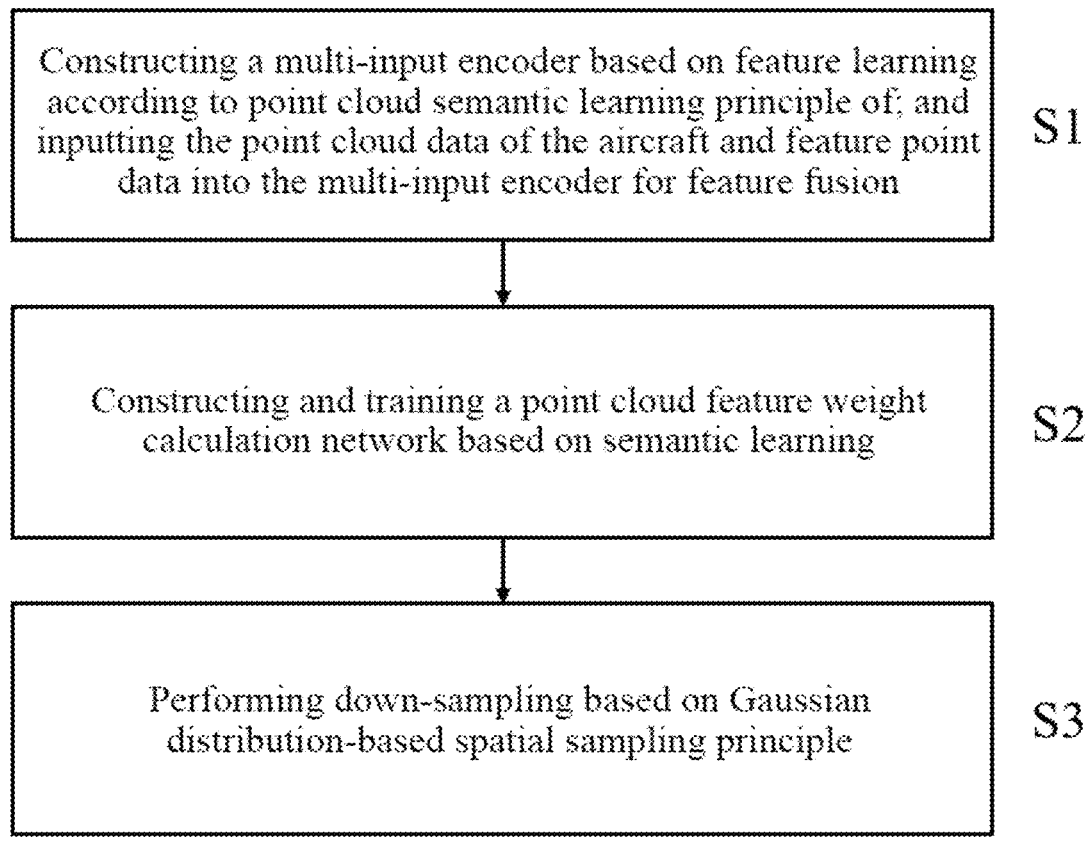
FIG. 1 is a flow chart of a semantic learning-based down-sampling method of point cloud data of an aircraft according to an embodiment of this disclosure.
Figure 2:
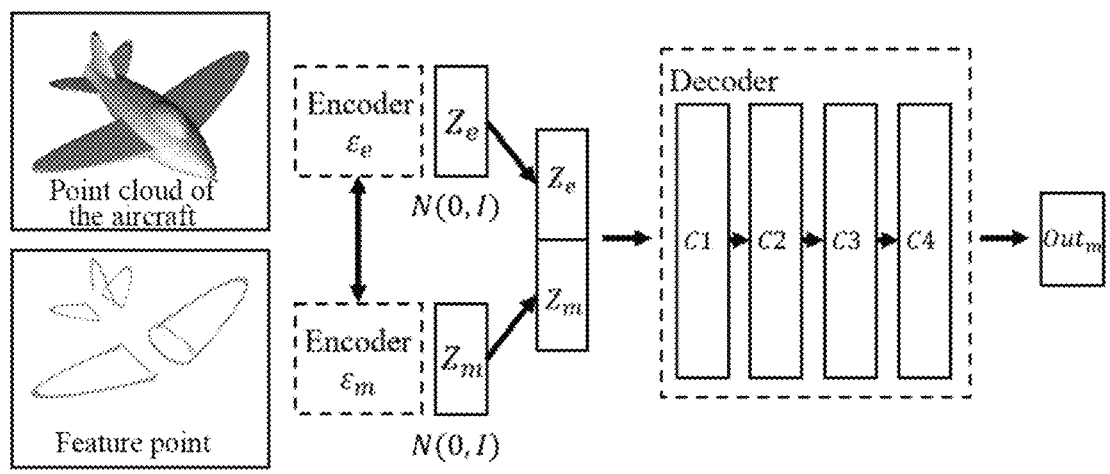
FIG. 2 schematically illustrates implementation of step (S1) in the down-sampling method according to an embodiment of this disclosure.
Figure 3:
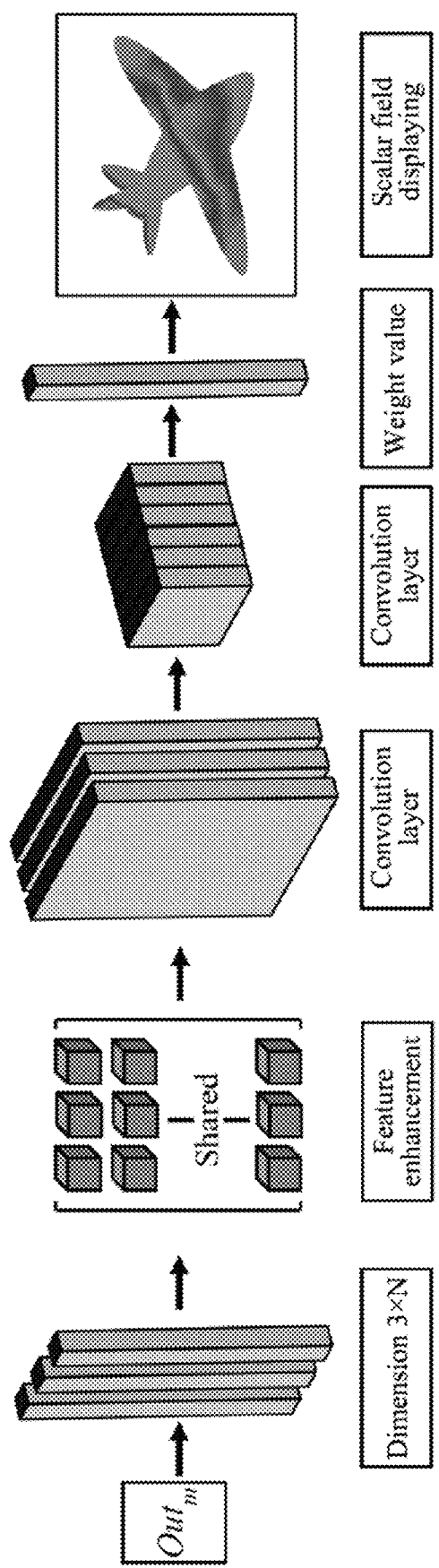
FIG. 3 schematically illustrates implementation of step (S2) in the down-sampling method according to an embodiment of this disclosure.
Figure 4:
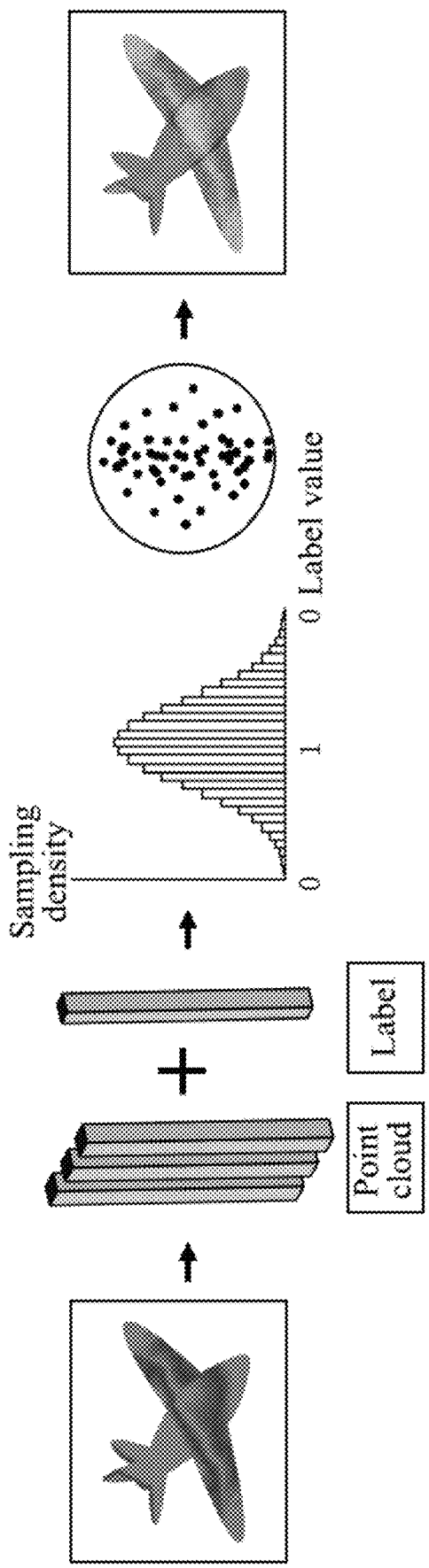
FIG. 4 schematically illustrates implementation of step (S3) in the down-sampling method according to an embodiment of this disclosure.

As shown in FIGS. 1-4, a semantic learning-based down-sampling method of point cloud data of an aircraft is illustrated, which includes the following steps.

(S1) A multi-input encoder is constructed based on feature learning according to point cloud learning principle. The point cloud data of the aircraft and feature point data are inputted into the multi-input encoder for feature fusion.

Step (S1) includes the following steps.

(S101) The multi-input encoder is designed. The point cloud data of the aircraft is denoted as $P_1, P_2, \ldots, P_n$, and the feature point data is denoted as $Q_1, Q_2, \ldots, Q_k$. The multi-input encoder includes a filter and a dense block, and the first layer of the filter maps the point cloud to a one-dimensional vector.

As the number of the point cloud is greatly larger than that of the feature point, the size and the stride of the filter convolution layer are 3×3 and 1, respectively, as shown in the following formula:

$$\text{Length}_{Z_e} = \text{Length}_{Z_m} = 3 \times \max(P_n, Q_k);$$

where $\text{Length}_{Z_e}$ and $\text{Length}_{Z_m}$ respectively represent the vector dimensions of the point cloud data of the aircraft and the feature point data, which can ensure the arbitrary scale of the point cloud data and the unitized dimension of data outputted from the encoder.

The dense block includes a plurality of convolution layers, and deep features of the architecture of the dense block can be preserved as much as possible in the encoding network.

(S102) Multi-input feature fused data outputted from the multi-input encoder is inputted into the decoder.

The final fused point cloud is reconstructed by using the simple and efficient architecture.

The decoder includes four convolution layers, represented by C1, C2, C3 and C4 respectively, and the output result of the decoder can be expressed as $\text{Out}_m$. The dimension of $\text{Out}_m$ is 3×N, where N represents the larger dimension in the two inputted point clouds. The encoder will automatically match the outputted dimension to the larger dimension to ensure the integrity of encoding information.

(S2) A point cloud feature weight calculation network is constructed based on semantic learning.

(S201) The point cloud feature weight calculation network is designed based on semantic learning.

The $\text{Out}_m$ is inputted into the point cloud feature weight calculation network, and passes through a shared feature enhancement device and two convolution layers successively to undergo wight prediction.

(S202) A trained weight is obtained by training the point cloud feature weight calculation network several times according to a standard data set of the point cloud data of the aircraft and the feature point data, and the trained weight is set as a fundamental parameter of the point cloud feature weight calculation network.

The to-be-measured data are inputted into the point cloud feature weight calculation network to predict the feature weight of each point in the to-be-measured data.

A first stage of the training is a forward propagation, and a point cloud data sample is selected from the point cloud data of the aircraft and the feature point data, denoted as $P_e(X_i, Y_i, Z_i)$, and $P_m(X_i, Y_i, Z_i)$, respectively.

If $P_m=0$, the point cloud data sample is inputted in single-channel manner.

The difference between the actual output $O_p$ and the ideal output $Y_p$ is calculated, where the actual output $O_p$ is expressed as follows:

$$O_p = F_n(\ldots F_2(F_1(\text{Encode}(P_e, P_m))W^{(1)})W^{(2)}\ldots)W^{(n)});$$

Encode represents the multi-input encoder; $F_1, F_2, \ldots, F_n$ is the activate function; and $W^{(1)}, W^{(2)}, \ldots, W^{(n)}$ is the weight of each convolution layer.

A second stage of the training is a reverse propagation, and the reverse propagation is performed according to a difference $\Delta_p$ between an actual output $O_p$ and an ideal output $Y_p$ by using a gradient descent objective function minimization method to adjust, so as to complete the training.

The to-be-measured data are inputted into the point cloud feature weight calculation network to predict the feature weight of each point in the to-be-measured data.

(S203) The feature weight of each point in the to-be-measured data is stored as a label. The label is displayed in a scalar field to obtain a feature weight distribution map, and the result is outputted visually.

(S3) The down-sampling is performed according to Gaussian distribution-based spatial sampling principle, which includes the following steps.

(S301) A sampling device is set. The feature weight of each point in the to-be-measured data is picked up by the sampling device, and the spatial weighted sampling is performed according to the feature weight. The spatial weighted sampling is performed on the feature weight of each point in the to-be-measured data by the sampling device.

(S302) A sampling method of the point cloud is designed based on Gaussian distribution-based probability function, shown as below:

$$f(x) = \frac{1}{(\sqrt{2\pi})\sigma}\exp\left(-\frac{(x-\mu)^2}{2\sigma^2}\right);$$

where $\mu$, $\sigma$ respectively represent the expectation and the variance of the Gaussian distribution.

The maximum weight value obtained in step (S301) corresponds to the highest point on a Gaussian curve, namely, the value corresponding to $x=\mu$.

The minimum weight value obtained in step (S301) corresponds to the lowest point on a Gaussian curve, namely, the value corresponding to 0.

A minimum spatial down-sampling is performed on the highest point, and a maximum spatial down-sampling is performed on the lowest point.

It should be emphasized that the embodiments of the present disclosure are illustrative, and the scope of protection of the present disclosure is not limited to the embodiments described above. All technical solutions obtained under the idea of the present disclosure shall fall within the scope of the present disclosure. It should be pointed out that improvements and modifications made by one of ordinary skill in the art without departing from the spirit of the present disclosure shall fall within the scope of the present disclosure defined by the appended claims.

What is claimed is:

1. A semantic learning-based down-sampling method of point cloud data of an aircraft, comprising:
   (S1) constructing a multi-input encoder based on feature learning according to point cloud semantic learning principle; inputting the point cloud data of the aircraft and feature point data into the multi-input encoder for feature fusion followed by decoding using a decoder to obtain decoded data as to-be-measured data;
   (S2) constructing and training a point cloud feature weight calculation network based on semantic learning to acquire a feature weight of each point in the to-be-measured data; and
   (S3) performing spatial weighted sampling on the feature weight of each point in the to-be-measured data followed by down-sampling according to Gaussian distribution-based spatial sampling principle.

2. The semantic learning-based down-sampling method of claim 1, wherein the step (S1) comprises:
   (S101) designing the multi-input encoder according to requirement of synchronous input of the point cloud data of the aircraft and the feature point data; performing, by the multi-input encoder, feature dimension increasing and the feature fusion on the point cloud data of the aircraft and the feature point data to obtain multi-input feature fused data with a unified data structure; and
   (S102) decoding, by the decoder, the multi-input feature fused data obtained in step (S101) to obtain the to-be-measured data.

3. The semantic learning-based down-sampling method of claim 2, wherein the decoder is composed of four convolution layers; and the to-be-measured data is consistent with the point cloud data of the aircraft and the feature point data in structure and dimension to ensure an integrity of encoded information.

4. The semantic learning-based down-sampling method of claim 1, wherein the step (S2) comprises:
   (S201) designing the point cloud feature weight calculation network based on semantic learning; and
   (S202) training the point cloud feature weight calculation network several times according to a standard data set of the point cloud data of the aircraft and the feature point data to obtain a trained weight as a fundamental parameter of the point cloud feature weight calculation network; and
   inputting the to-be-measured data into the point cloud feature weight calculation network to predict the feature weight of each point in the to-be-measured data.

5. The semantic learning-based down-sampling method of claim 4, wherein the step (S2) further comprises:
   (S203) storing the feature weight of each point in the to-be-measured data as a label followed by displaying in a scalar field to obtain a feature weight distribution map of each point in the to-be-measured data.

6. The semantic learning-based down-sampling method of claim 4, wherein the step (S202) is performed through steps of:
   (S202-1) collecting measurement data of the aircraft from a point cloud database of the aircraft obtained in a production process; manually extracting the feature point data from the measurement data of the aircraft; setting a weight value according to an importance of individual parts of the aircraft, wherein the weight value ranges from 0 to 1; when the weight value is equal to 0, it indicates a corresponding part is the least part of the aircraft, and when the weight value is equal to 1, it indicates that a corresponding part is the most important part of the aircraft; and constructing the standard data set of the point cloud data of the aircraft and the feature point data;
   (S202-2) training the point cloud feature weight calculation network based on semantic learning;
   wherein a first stage of the training is a forward propagation, and a point cloud data sample is selected from the point cloud data of the aircraft and the feature point data, respectively; and
   a second stage of the training is a reverse propagation, and the reverse propagation is performed according to a difference between an actual output and an ideal output by using a gradient descent objective function minimization method to adjust an internal reference of a convolution kernel, so as to complete the training; and
   (S202-3) inputting the to-be-measured data into the point cloud feature weight calculation network to predict the feature weight of each point in the to-be-measured data.

7. The semantic learning-based down-sampling method of claim 1, wherein the step (S3) comprises:
   (S301) setting a sampling device; picking up, by the sampling device, the feature weight of each point in the to-be-measured data; and performing the spatial weighted sampling according to the feature weight;
   (S302) performing the down-sampling based on the Gaussian distribution-based spatial sampling principle, wherein a maximum weight value and a minimum weight value obtained in step (S301) respectively correspond to a highest point and a lowest point on a Gaussian curve; and a minimum spatial down-sampling is performed on the highest point, and a maximum spatial down-sampling is performed on the lowest point.

* * * * *